W. R. ECKART.
Compressed Air-Engines.

No. 216,563. Patented June 17, 1879.

Witnesses
Geo. H. Strong
Frank A. Brooks

Inventor
Wm R. Eckart
By Dewey & Co.
Attys

2 Sheets—Sheet 2.

W. R. ECKART.
Compressed Air-Engines.

No. 216,563. Patented June 17, 1879.

UNITED STATES PATENT OFFICE.

WILLIAM R. ECKART, OF GOLD HILL, NEVADA.

IMPROVEMENT IN COMPRESSED-AIR ENGINES.

Specification forming part of Letters Patent No. 216,563, dated June 17, 1879; application filed April 11, 1879.

*To all whom it may concern:*

Be it known that I, WILLIAM R. ECKART, of Gold Hill, county of Storey, and State of Nevada, have invented an Improvement in Compressed-Air Engines; and I hereby declare the following to be a full, clear, and exact description thereof, reference being made to the accompanying drawings.

My invention relates to certain improvements in the construction and operation of compressed-air engines, whereby I am enabled to use the air expansively, and to employ the low temperature thus produced to cool a larger body of air, which is introduced around the lining of the cylinder. This air is drawn in by the draft caused by the discharge of the exhaust-air into a chamber space or nozzle, where the two streams of air are united, and the resultant stream of cool air is discharged into the mine or other place where it may be needed.

In the use of compressed air as a motor for engines of any description, a considerable amount of heat is developed in the compressors, which is by various means carried away, so that the compressed air is delivered to the drills or engines at about the temperature of the ordinary air. If, however, this air is used expansively in the engine, heat is reabsorbed by it to such a degree that ice will be formed from any vapor in this or the surrounding atmosphere to such an extent as to stop the passages in the engine, and shortly prevent its working. I have taken advantage of this fact, when engines of this character are employed in deep mines where the heat is great, or in any other similar place, to employ this low temperature to cool a larger body of the surrounding air, which is drawn in around the lining of the cylinder, and while being thus cooled this air keeps the temperature of the cylinder and its passages so high as to prevent the formation of ice, and thus allow the more advantageous use of the air expansively.

I have found that by my method the exhaust-air from an engine will draw in and cool from one and one-half to two and one-half times its own bulk of the exterior air or vapor, and the two currents unite and form a resultant stream, which may be discharged into the surrounding atmosphere to cool it, or be conveyed in pipes to any point where it may be needed.

Figure 1:
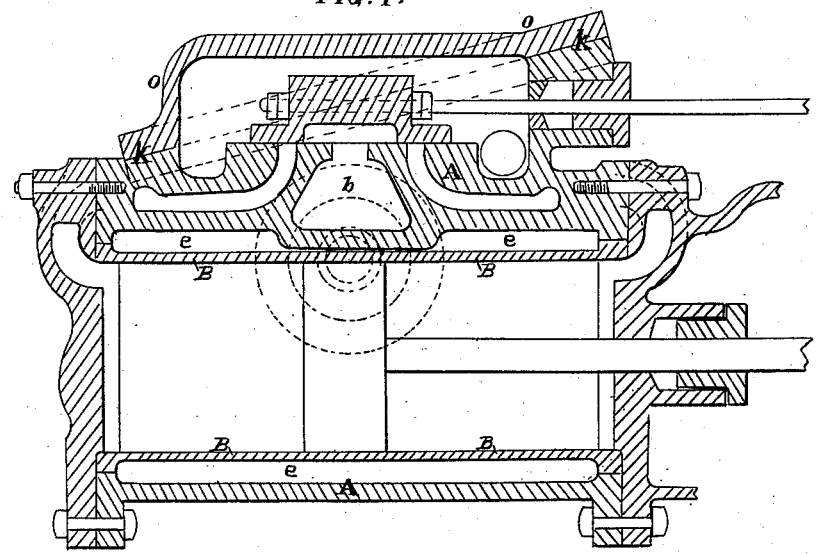
Figure 2:
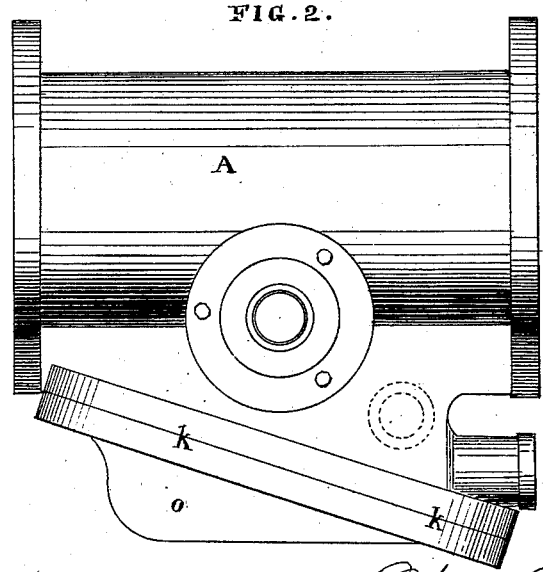
Figure 3:
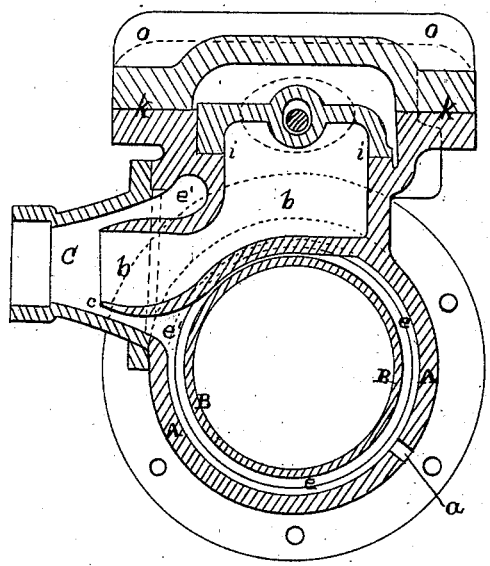
Figure 4:
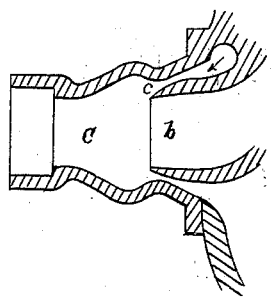
Figure 5:
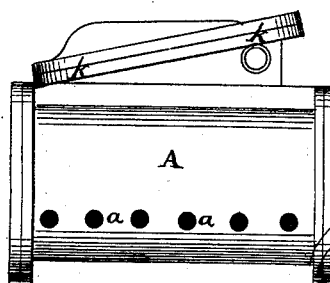

Referring to the accompanying drawings for a more complete explanation of my invention, Figure 1 is a sectional elevation through the center of cylinder A and steam or air ports. Fig. 2 is an outside plan of cylinder A, showing the openings $a\ a\ a$ and the exhaust-nozzle $c$. Fig. 3 is a section through the exhaust port and nozzle $c$. Fig. 4 is a section through the exhaust-port and nozzle $c$, showing a different form of nozzle that may be used. Fig. 5 is a side view.

The cylinder A is formed as is usual for the purpose of containing and operating a reciprocating piston by means of suitably-formed steam or air ports to the cylinder and escape ports or port from the same.

The working barrel or liner B has an annular space, $e\ e$, surrounding the same, which may be formed in the casting of the cylinder A, or by means of a removable liner, B, of the same or different material. Communicating with this annular space, and surrounding the exhaust-nozzle $b$, is an opening marked $e'\ e'$, and by means of a suitably-formed nozzle, $c$, (which can, if necessary, be removed,) an annular opening, C, is formed around the lip of the exhaust-nozzle $b$, of a desirable form, similar to Fig. 3 or Fig. 4, or otherwise.

The air or steam-chest is cut by a plane having a suitable angle to the valve-face, as is shown at $k\ k$, so as to enable the valve-face to be dressed off without difficulty upon removing the cover $o\ o$.

Operation: The exhaust-air escaping through the exhaust port and nozzle $b$ reduces the pressure in the annular chambers C and C, as well as in the annular space or jacket $e\ e$ and $e'\ e'$, and the denser medium or air surrounding the outside of the cylinder flows in through suitably formed and placed openings $a\ a\ a\ a$, to supply the reduction of pressure caused by the velocity of the escaping air from the exhaust-nozzle $b$. The entering air or vapor that passes through the openings $a\ a\ a$, having a higher temperature than the air inside the liner B B or escaping exhaust, gives up a portion of its heat, thereby enabling a greater degree of expansion to be obtained from the volume of air in the cylinder without freezing either in the cylinder or in the escape nozzle or ports, thereby accomplishing a greater economy in the use of compressed air.

Having thus described my invention, what I claim as new, and desire to secure by Letters Patent, is—

1. The improvement in the operation of compressed-air engines, consisting in the union of two or more component streams of air in a junction chamber space or nozzle, c, one of said streams consisting of the exhaust-air from the cylinder, and the other consisting of air or vapor which enters through the openings a a and is compelled to pass around the liner B, substantially as and for the purpose herein described.

2. The cylinder A, with its liner B, having the surrounding space e and the ingress-openings a a, connecting said space with the outside air, in combination with the exhaust-nozzle b, opening into the chamber C, and having the surrounding space e e, connecting the space e' with the chamber C, substantially as and for the purpose herein described.

3. The improvement in the method of refrigerating or cooling the air in confined localities, consisting in reducing the temperature of the air or vapors that are compelled to pass over or around the liner B and through the nozzle c by means of the lower temperature of the expanding air in the working cylinder or liner B, whereby a greater amount of cold air is discharged through the opening or nozzle c than would be otherwise done by the exhaust-port b, substantially as herein described.

In witness whereof I have hereunto set my hand.

WILLIAM R. ECKART.

Witnesses:
FRANK A. BROOKS,
S. H. NOURSE.